Jan. 30, 1940.  N. D. LEVIN  2,188,790
MATERIAL HANDLING MECHANISM
Original Filed Feb. 5, 1934   6 Sheets-Sheet 1

INVENTOR:
Nils D. Levin,
BY
Chas. M. Nissen,
ATT'Y INVENTOR:
Nils D. Levin,
BY
Chas. M. Nissen,
ATT'Y.

Patented Jan. 30, 1940

2,188,790

UNITED STATES PATENT OFFICE 2,188,790

MATERIAL HANDLING MECHANISM

Nils D. Levin, Columbus, Ohio, assignor to The Jeffrey Manufacturing Company, a corporation of Ohio Application February 5, 1934, Serial No. 709,746
Renewed December 9, 1937

20 Claims. (Cl. 198—8)

In material handling operations, illustrated for example, in coal mining, there are frequently employed machines comprising gathering and loading devices for the purpose of loading coal from the face of a mine working and to deposit such coal into mine cars, by means of which the coal may be quickly removed from the mine.

My invention relates to such a device and embraces, generally, a gathering conveyor adapted to gather loose coal shot down from a working face, and a rear or discharge conveyor adapted to receive the coal gathered by the gathering conveyor, which gathering conveyor has its delivery end arranged above the receiving end of the discharge or rear conveyor, the former being supported for pivotal movement about a vertical axis at its discharge end. The receiving end of the rear conveyor is formed as a hopper and is adapted to receive coal as it is discharged from the delivery end of said gathering conveyor.

The rear conveyor may be formed of three sections, a receiving section, an intermediate section and a discharge section, the latter being supported for pivotal movement about a vertical axis at its point of connection with the intermediate section. The intermediate section together with the discharge section is yieldably mounted for vertical adjustment on a horizontal axis supported by the receiving section. The receiving section together with the two other sections is mounted for pivotal movement about a horizontal axis and for pivotal movement about a vertical axis by a turntable supported by the truck frame.

In accordance with the present invention, improvements are also made in the gathering conveyor of the machine, which gathering conveyor is mounted for horizontal pivotal movement relative to the rear or discharge conveyor; and the gathering conveyor is adapted also to be lifted vertically for the insertion therebeneath of a pony truck for facilitating transportation of the machine from one place to another in a mine.

Also, in the present invention, instrumentalities are provided for enabling the gathering conveyor of the machine to be vertically tilted along the longitudinal axis of the conveyor towards either side; and one of the objects of the present invention is to provide a construction whereby this tilting may be facilitated, in order to more readily feed the gathering conveyor into the coal to be loaded into the mine cars.

A further object of the present invention is to provide improved and simplified mechanism for effecting horizontal feeding movement of the gathering conveyor.

A further object of the present invention is to provide a machine of the character indicated above, in which the above enumerated features are combined to produce a machine which is very flexible in its operation and is very easily handled.

The invention is exemplified in the combination and arrangement of parts shown in the accompanying drawings, and described in the following specification, and it is more particularly pointed out in the appended claims.

It may be noted in this connection that Figs. 10 to 17 inclusive well illustrate the flexibility of the machine and its ready adaptability for loading operations in any position in a mine room.

Referring more particularly to the drawings, it will be seen that the machine includes a gathering conveyor and a rear or discharge conveyor including a plurality of sections, A being the gathering conveyor, C is the discharge section and B the receiving section of the rear or discharge conveyor.

One of the principal features of the invention lies in the mechanism for feeding the gathering conveyor into piles of material, such as coal shot down from a mine face, for enabling the flights of the gathering conveyor to pick up the same. Specifically, the gathering conveyor includes the base plate 1, which has a portion 2 tapering towards the gathering end of the conveyor A. The base plate 1 has welded to it corresponding brackets 3, which are hinged at 4 (see Fig. 4) to a bracket 5, which connects the conveyor A to rear conveyor section B. The hinge 4 embraces a pin 6 secured in the arms 7 of the brackets 3, this pin operating in a slot 8 of bracket 5 secured to bracket 9.

By having this pin and slot hinge the front portion of the gathering conveyor A may be lifted vertically by means of mechanism to be described hereinafter, so that a pony truck may be positioned under the conveyor for transportation of the machine along a mine track. Also by having the pin and slot hinge the gathering conveyor A may be laterally tilted to the extent permitted by this hinge, by means described hereinafter when it is desired to so operate the gathering conveyor during feeding operations. For positioning the pony truck under the gathering conveyor A, the latter is lifted sufficiently to connect the pony truck with the coupling 69, which forms a pivotal connection between the truck and conveyor. When the machine is moved along a mine track, shoes 70 engage the rails of the track to space the front end of the discharge conveyor from the track rails and support said front end on said rails.

For enabling the gathering conveyor to be swung horizontally, it is pivotally interconnected at 10 to the bottom 11 of discharge conveyor B. The pivotal connection 10 includes a ring 10a welded or otherwise secured to the bottom plate 11 of the discharge conveyor B. The bracket 9 of the gathering conveyor is provided with an opening 10b having an annular shoulder 10c therein, which opening 10b is brought into registry with the ring 10a, when the conveyers A and B are connected together. The connection between the conveyors is secured by means of a retaining plate 11a secured by rivets, or the like, 11b.

It will be observed that the pivotal coupling 69 is positioned to the left of the center of gravity of the gathering conveyor A. This results in the discharge end of the gathering conveyor being continuously in raised position so as to clear the receiving hopper of discharge conveyor B.

The mechanism for operating the gathering conveyor A includes a motor indicated generally at 12 (Figs. 2 and 4, for example) which is mounted on the frame of the gathering conveyor A and which drives shaft 13 through suitable standard type speed reducing gearing (not shown), enclosed in housing 14. Keyed to shaft 13 for rotation therewith is a sleeve 15, provided with a flange 16 to which is bolted, by means of bolts 17, a housing 18, which encloses a friction disc coupling 19. Therefore, as housing 18 rotates, the discs 20 connected to the housing 18 are rotated, and these discs 20, being in frictional engagement with discs 21, connected to sleeve 22, produce rotation of this sleeve. The engagement between discs 20 and 21 may be adjusted by means of springs 23, the pressure of which springs may be varied by screw plugs 24, positioned in bosses 24a on the flange 16.

Sleeve 22 is keyed to a second shaft 25, which is thus rotated. Shaft 25 is provided with a beveled pinion 26 which meshes with a beveled gear 27, keyed to an upstanding shaft 28, for rotating this shaft; and it will be understood, of course, that shaft 28 is rotated continuously through the drive mechanism described above as long as the motor 12 is operating. The resulting thrust transmitted to shaft 25 is carried by a collar 29 on shaft 25 this collar being received in an annular recess 31 in a sleeve portion 32 of casting 33. Suitable bushings 34, 34a are interposed between shaft 25 and sleeve member 32. Casting 33 forms the support for the motor 12, reducing gear housing 14, shaft 25 and shaft 28; and is bolted or otherwise suitably secured to the base plate of the gathering conveyor A. Shaft 28 is held in position by top and bottom bolts 28a, 28a, and retaining washers 28b, 28b.

Shaft 28 constitutes the driving member for the mechanism for laterally feeding the gathering conveyor A into the coal. Shaft 28 also has keyed thereto the sprocket 35 which acts as the driving sprocket for the gathering conveyor chain, which will be referred to hereinafter in greater detail.

The mechanism enabling the gathering conveyor A to be swung laterally for feeding into the coal to be handled by the loader, includes the superposed drums 36 and 37 loosely mounted on the shaft 28, and provided with mechanism enabling the shaft to operate the drums. The drums 36 and 37 have wound thereon the cables 38 and 39, respectively.

Figures 1, 2, 8, 9:
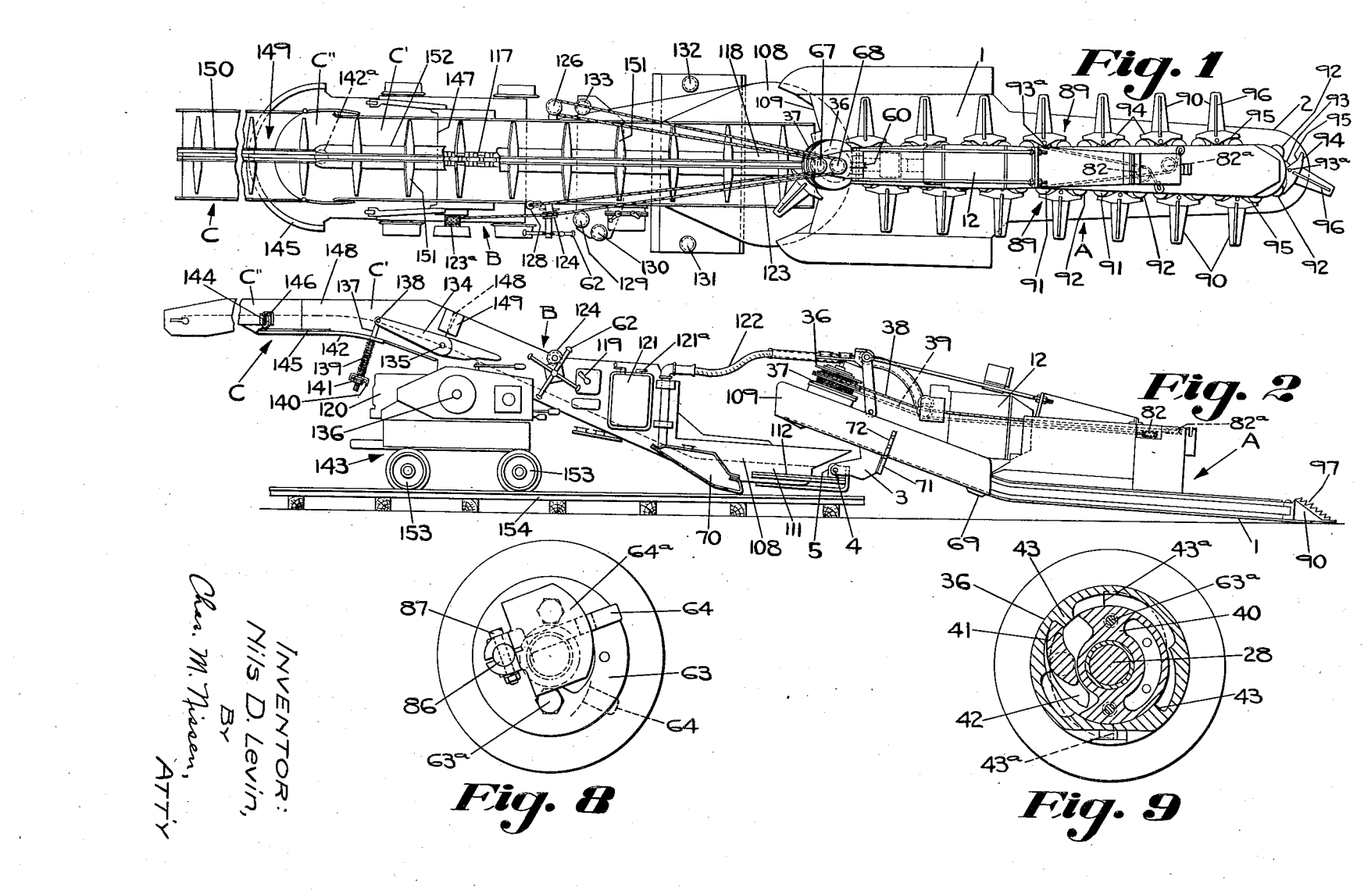
Fig. 1 is a plan view of a loading machine embracing the features of the present invention.
Fig. 2 is a side elevation of the machine of Fig. 1.
Fig. 8 is a plan view of a pawl actuating lever, the view being taken in the plane of the line 8—8 of Fig. 4, looking in the direction of the arrows.
Fig. 9 is a section taken on the line 9—9 of Fig. 4, looking in the direction of the arrows.
Figure 4:
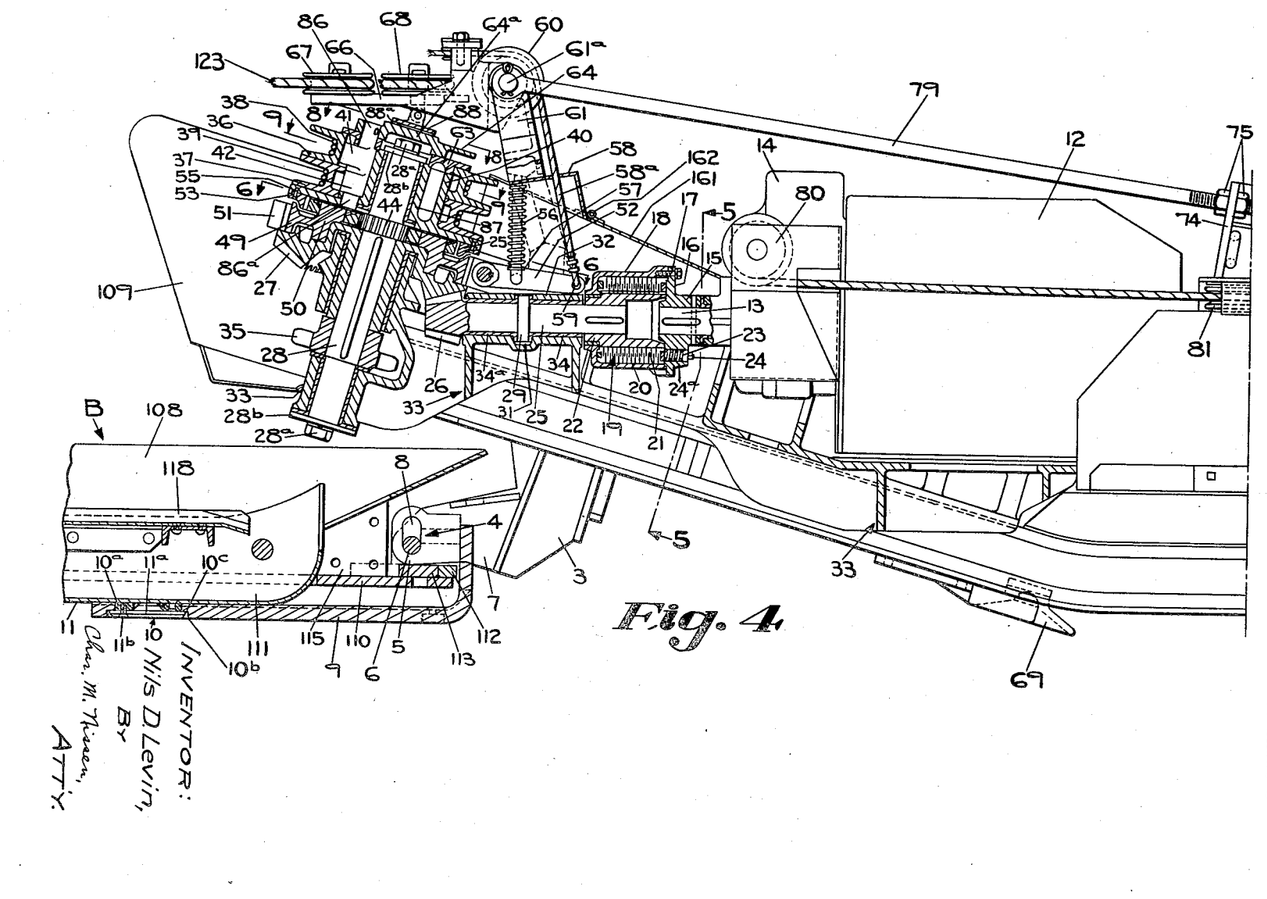
Fig. 4 is a detail sectional elevation of the head end of the gathering conveyor, showing details of construction of cable winding mechanism and operating means therefor, this view completing the showing of Fig. 3.

Drums 36 and 37 are independently operable, there being provided operating means including a unit embracing a spider in the form of a casting 40 having mounted therein the pawls 41 and 42, pawl 41 operating drum 36 and pawl 42 operating drum 37, the pawls being arranged so that when one of them is in operative position, the other is in inoperative position so that one of the drums will be free to pay out its cable as the other drum is operated to wind its cable. For operating, the drums are provided interiorly with abutments, such as indicated at 43, against which the corresponding pawl is adapted to engage when in operative position. It will be understood that when the motor 12 is running in one direction, one of the drums, for instance drum 36, may be operated while drum 37 is free, and when the motor is reversed, drum 37 may be operated and drum 36 becomes free. This means, of course, that the pawls 41 and 42 must be shifted responsively to reversals of the motor, and mechanism for so doing is provided. This mechanism will be described hereinafter. Figs. 4 and 9 illustrate the details of the pawl and drum mechanism.

Figures 5, 6:
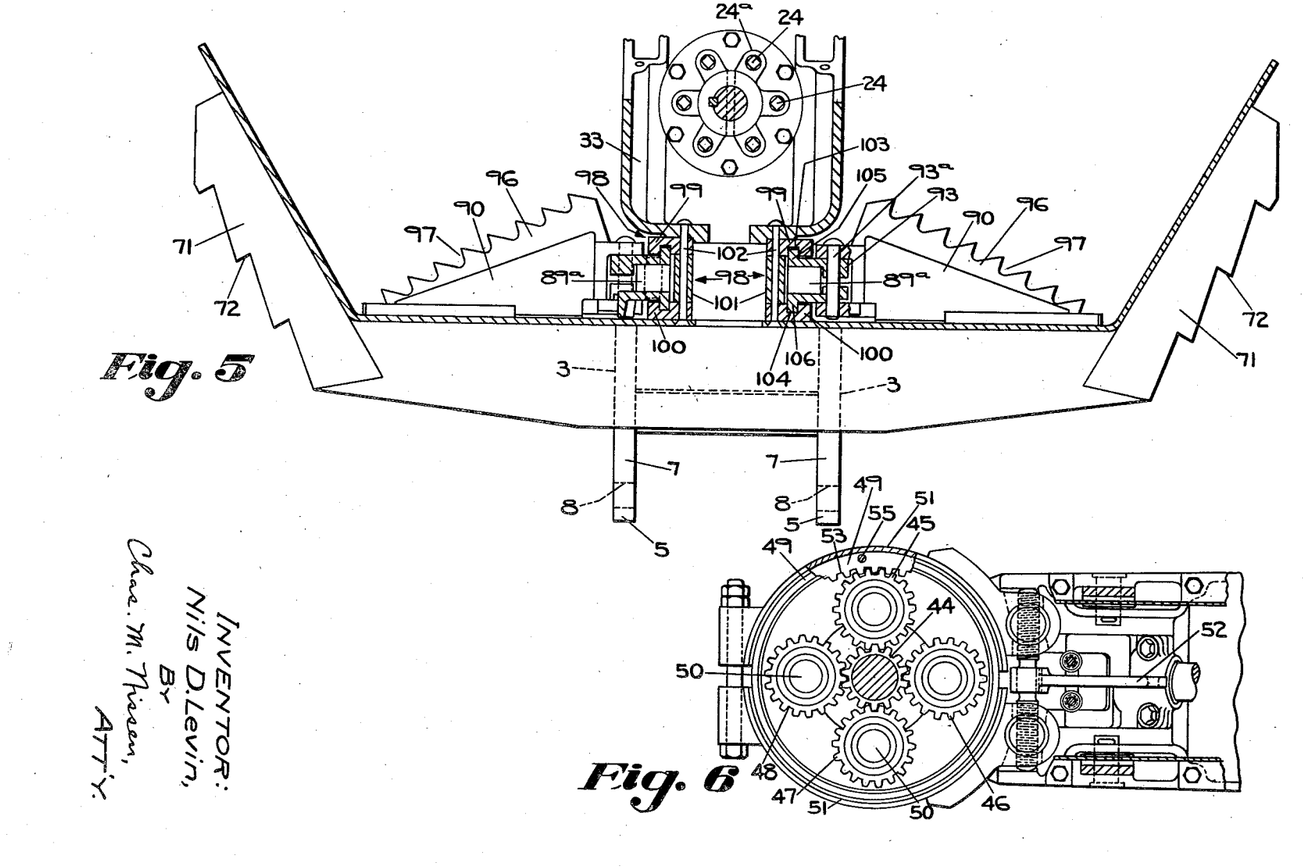
Fig. 5 is a sectional elevation taken on line 5—5 of Fig. 4.
Fig. 6 is a view showing details of construction of brake mechanism for controlling the cable actuating mechanism, the view being taken generally on the line 6—6 of Fig. 4, looking in the direction of the arrows.

The mechanism whereby the pawls 41 and 42 may be operated will now be described. Referring more particularly to Figs. 4 and 6 it will be seen that shaft 28 is provided with a gear 44, which, of course, continuously rotates with the shaft 28. This gear forms a sun pinion for operating a system of planetary gears made up of gears 45, 46, 47 and 48, as viewed in Fig. 6, and which normally are free to rotate around the pinion 44 of the planetary system, rotating with them the brake drum 49. It will be observed from Fig. 4 that the brake drum 49 is provided with projections 50 which serve as shafts for the planetary gears, and through which motion is transmitted to the brake drum. A brake band 51 surrounds the brake drum 49, the brake band 51 being operated by lever 52 and the right and left handed screws shown in Fig. 6. Pressure exerted on the brake band restrains the brake drum and secures the gears 45, 46, 47 and 48 against traveling around the teeth of gear 44. This restraining of rotation of the drum 49 holds the planetary gearing against rotation around gear 44, but these gears 45, 46, 47 and 48 are continued to be driven by the continuously rotating gear 44.

In mesh with the planetary gearing is an internal gear illustrated at 53, see Figs. 4, 5 and 6 to which is riveted, by rivets 55, 55, the casting 40, so that, when the brake band 51 is applied to the brake drum 49 to stop the rotation of the latter, either pawl 41 or 42 will be brought into operative position with their respective drums, depending upon the direction of rotation of the shaft 28.

Lever 52, operating the brake band, is held normally in inoperative position by means of a spring 56 supported on a rod at 57, the spring 56 bearing against housing 58. Lever 52 is operated by a cable 58a secured at 59 to the end of lever 52, this cable passing over sheave 60, mounted on standard 61, and extending around a capstan 62, which is mounted on the section B of the rear conveyor, as seen in Fig. 2. When capstan 62 is operated to wind cable 58a thereon, lever 52 is operated against the pressure of spring 56 to apply brake band 51 to the brake drum 49.

To the top part of the casting 40 is secured by cap screws 63a, a cap 63 which forms a retainer for the rope drums and also a bearing for one end of the pawl shaft 86. The lever 64 is secured to the upper end 86 of the pawl shaft and is pivotally shiftable relative to cap 63. Shifting the lever 64 from one extreme to the other, positions one or the other of the pawls in contact with their respective abutments 43 and 43a of the drums 36 and 37. The shifting of lever 64 may be automatically accomplished by a friction plate 88 pivotally secured to sheave support 66 which in turn is mounted for pivotal movement about a pin 61a carried by the support 61. The plate 88 is faced with a friction material 88a and is located above and eccentric of the pivotal point of lever 64 and in frictional engagement with plate 64a which is integral with lever 64. It will be seen upon rotation of the casting 40 and cap 63 that the lever 64 will rotate therewith, the lever being fixed to the top end 86 of the pawl shaft. It may be seen that the bottom end 86a of the pawl shaft is journaled in the casing 40 while the top portion 86 is journaled in the cap 63.

When the motor is operating to rotate the casting 40 in a clockwise direction as viewed in Figs. 8 and 9 the lever 64 will be retarded in its rotation by the friction plate 88 together with the weight of sheaves 67, 68 and sheave support 66 resting upon the plate 64a. When the lever 64 is in the full line position shown in Fig. 8, pawl 41 is in engagement with drum 36, and when the lever 64 is in the dotted line position of Fig. 8, pawl 42 will be in contact with drum 37.

Secured to the sheave support 66 are the sheaves 67 and 68 about which is passed a cable 123 which is employed for lifting the gathering conveyor A.

Figure 3:
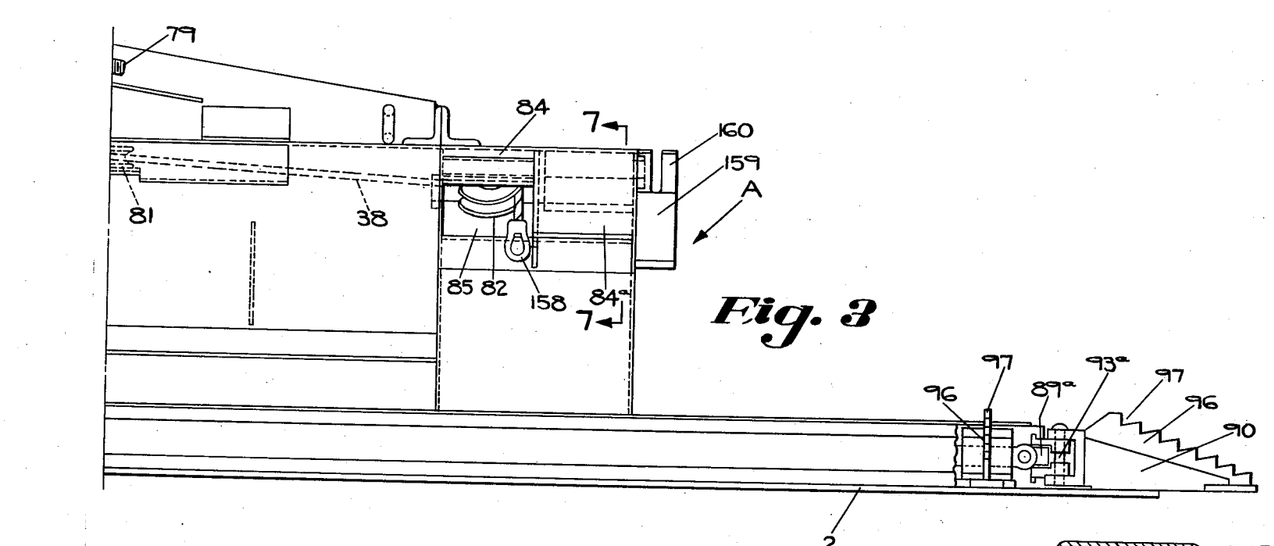
Fig. 3 is a side elevation showing details of the gathering end, Fig. 3 being a continuation of the structure shown in Fig. 4.
Figure 7:
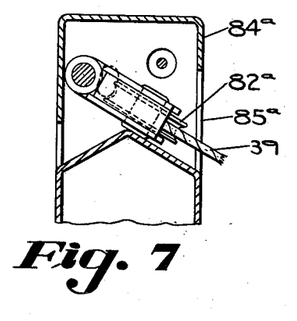
Fig. 7 is a sectional view taken on the line 7—7 of Fig. 3.

Referring to Figs. 1 and 2, it will be seen that the cables 38 and 39 extend from the drums 36 and 37 to the front of gathering conveyor A, these cables being suitably guided on sheaves, such as illustrated at 80, 81 and 82 (Figs. 2 and 4). One of these cables, for example cable 38, is mounted so as to extend from one side of the conveyor A, while the other cable 39 extends to the opposite side of conveyor A. This is illustrated clearly in Figs. 3 and 7; and it will be seen from these views that in order to effect this, the similar sheaves 82 and 82a are enclosed in the respective housings 84 and 84a, which, however, have their opposite sides cut away, as indicated at 85 and 85a for the passage of these cables.

The purpose of this arrangement is clearly shown in Figs. 10 to 17 inclusive, which views show the manner of extending and anchoring these cables to suitably positioned anchors, such as roof jacks, indicated at 84b in order to accomplish the desired feeding movements of the gathering conveyor, in order to accommodate the machine to various kinds of cuts at a working face. It will be seen in each instance that by rotating one of the drums, 36 or 37 as the case may be, to shorten the corresponding cable, after paying out the other cable, a corresponding turning movement of the gathering section is effected. These views will be referred to in more detail hereinafter.

From Fig. 1 it will be observed that the base plate 1, of the conveyor A, has the tapering section 2, as previously mentioned herein. This section 2, because of its tapering configuration, and correspondingly reduced width, lends itself to a more ready lateral tilting than would be the case were the width of the left-hand part of the gathering conveyor, as viewed in Fig. 1, maintained along the entire length of the section.

The conveyor chain of this gathering conveyor A, which is indicated generally at 89, includes an endless conveyor chain 89a (Fig. 5), operating in the usual manner around suitable sprockets adjacent the ends of the gathering conveyor. Sprocket 35, Fig. 4, illustrates the driving sprocket for the conveyor chain. The conveyor chain carries flights 90, and the chain and flights are provided with means for preventing a whipping action of the flights as the chain passes around the respective sprockets, thereby preventing scattering of the material being conveyed beyond the limits of the loader. For preventing the whipping action, the conveyor chain includes links 91, which are of rounded configuration to provide cam surfaces 92.

Each of the flights 90 is freely pivoted on pin 93a to a selected link 93, and each of the flights 90 is provided with laterally projecting lugs or wings 94 which are adapted to engage the cam surfaces 92 of adjacent links 91. The ends of the lugs 94 are also cammed as at 95, to cooperate with the cam surfaces 92. The cooperating cam surfaces 92 and 95 provide a means for progressively reducing the speed of the flights as they reach discharging position, the flights yielding gradually under the weight of the material as the chain and flights pass around the sprocket 35, thereby preventing forcible throwing of the material through the discharge end of the conveyor trough. It will be seen, therefore, that as the flights travel along the conveyor, the weight of the material being conveyed will tend to press the flights rearwardly around the pivot points 93a, and will maintain the lugs 94 continuously in engagement with adjacent cam surfaces 92. Therefore, instead of whipping around the sprocket at the front end of the gathering conveyor, each flight will be turned backwardly gradually around its pivot 93a and the rear lug 94 maintained in engagement with its adjacent cam surface 92 until the material is completely discharged. In this way the objectionable whipping action referred to above is prevented, and the material is transferred without excessive force from the conveyor A into section B of the rear conveyor.

Each of the flights 90 is formed with an upstanding web 96, each web having its edge notched, as indicated at 97 to facilitate entry of the gathering conveyor into a pile of coal when swung laterally. That is to say, these notches or teeth perform the function of serving to penetrate into and grip the material being acted upon.

From Fig. 5 it will be noted that the links of the conveyor chain are guided in the course of their travel by guides 98, which include top and bottom members 99 and 100, and a side wall member 101, holding the members 99 and 100 in proper spaced relation. The parts are secured in position by means of rivets 102 extending from the bottom of the conveyor trough to casting 33. The top and bottom guide members have similarly shaped, but oppositely directed grooves 103 and 104, in which oppositely extending lugs 105 and 106 of the conveyor chains are adapted to run and which form a track in which lugs 105 and 106 travel.

Receiving the material discharged from the gathering conveyor A is the receiving section B of the rear conveyor, which conveys the material to the intermediate and discharge sections of the rear conveyor. The receiving section B is upwardly inclined so that the discharge section C will be elevated sufficiently above the level of the mine floor to effect loading of mine cars or the like. Section B includes a hopper-like material receiving end 108 which is positioned under the discharge end 109 of the gathering conveyor A, conveyor A being connected to the bottom 11 of the hopper 108 by the pivotal connection 10.

On the plate 110 welded to the trough 111 of section B, there is welded the arcuate strip 112, which forms an arcuate track for shoe 113 which is welded to bracket 5.

Positioned on section B are reversing switch 119 for motor 120, which operates conveyor chain 117, running in guides 118, and control box 121, which controls both motors 120 and 12. Conductor cable 122 supplies current to motor 12. Reversing switch 121a controls motor 12.

Also mounted on section B is the winding drum 123a for operating the cable 123, which cable is employed for lifting the gathering conveyor A and also for facilitating adjustment of the machine for various types of cut as illustrated in Figs. 10 to 17 inclusive. When employed for lifting the gathering conveyor A, cable 123 passes from the drum 123a over guide pulley 124 (Fig. 1), sheave 68 mounted on the sheave support 66, thence around sheave 126 on the section B, thence around sheave 67 also mounted on support 66, thence back to an eye 128 on section B where it is fastened.

When employed as in Figs. 10 to 17 inclusive, the cable 123 is released from these mountings, and passed around suitable ones of the guide sheaves 129, 130, 131, 132 or 133, as may be required for the given location, the free end of the cable being anchored to a jack 84a as will become apparent from Figs. 10 to 17 inclusive.

The horizontal discharging section C of the rear conveyor is made up of two pivotally interconnected parts C' and C", the latter forming the extreme end section.

It is desirable that section C be vertically yieldable, one of the advantages of the present machine being in its adaptability to handle material, such as coal, when in large lumps. In coal mining operations, therefore, the amount of blasting required to shatter the working face of the coal is materially reduced. In view of the fact that the space in which the operations are carried out is frequently very limited, it sometimes happens that large lumps of coal may become lodged between the discharge unit of the machine and the ceiling of the mine room in which the machine is operating. In order to prevent possible damage or breakage of parts of the machine under such conditions, section C is vertically yieldable.

To this end, the portion C' of section C is yieldably interconnected by suitable hinge structure to the receiving section B. This yieldable hinge structure includes the hinge or pivotal arms 134 which are secured to the end of the side walls of the trough of section B. A pin 135 fixed to section C is pivoted in arm 134.

Each arm 134 is bifurcated at its end for receiving an eye bolt 137. Each of these bolts is secured in position by a pin 138, which pin, nevertheless, enables pivotal movement of the respective bolts. The eye bolts are threaded at their lower ends, and serve as supports for the springs 139, these springs being held in position on the bolts 137 by cooperation of a tie channel 140 and nuts 141 with a plate 142 extending along the underside of portion C' and through which the bolts 137 are passed. The tension of springs 139 is adjusted by means of the nuts 141, the springs yieldably cushioning the portion C' and therefore section C under vertical impacts which may be impressed thereon.

In addition to being vertically yieldable, the rear conveyor is mounted for pivotal movement so that the ends may be moved to varying heights during operation. The rear conveyor is therefore turnably mounted around axis 136 suitably mounted on a turntable which is mounted for pivotal movement about an upright or vertical axis on the frame of the truck 143.

Plate 142 extends along the underside of section C, extending from beneath the portion C' to beneath portion C", forming reinforcing means for these portions and for the section C. Plate 142 is welded to the underside of the bottom of the conveyor trough of portion C'.

The end portion or section C" is pivoted at 142a to the portion C'. Portion C" is swingable in a horizontal arc around pivot 142a, being carried by the pivot and by anti-friction rollers 144 traveling on an arcuate track 145. The rollers 144 are mounted in brackets 146 mounted on the sides of the conveyor trough of section C''. Line 147 of Fig. 1 indicates the division between portions C' and B, the ends of the plates forming the sides of the trough of these portions being spaced on each side of the machine, as indicated at 148, suitable guard plates 149 being mounted to prevent escape of material.

The material is conveyed along the troughs of sections B and C by means of the conveyor chain 117 to which flights 151 are connected. Chain 117 is suitably guided by guides 118, 152, and 150, the return run of the chain being beneath the conveyor trough, and therefore not shown in the drawings. Truck 143 is mounted on wheels 153 adapted to run on rails 154 of a mine track.

Referring in more detail to Figs. 10 to 17 inclusive, it will be seen that these views show, in diagrammatic manner, the positions which the machine may take when operating in connection with various types of mine cuts.

Figure 10:
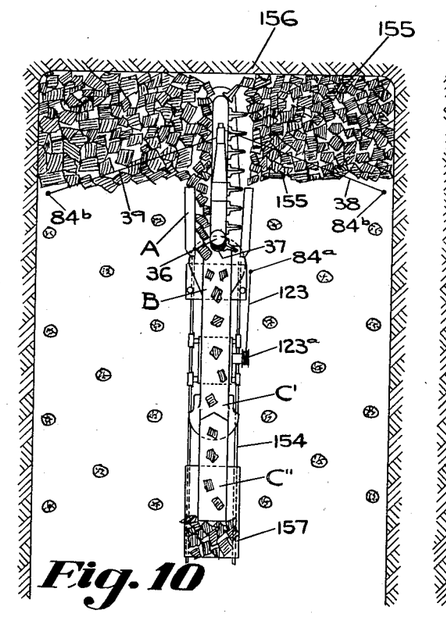
Fig. 10 is a diagrammatic view showing the position of the machine for sumping operations.

Fig. 10 shows the machine in position for sumping operations. Coal, indicated at 155, has been shot down from the mine face 156. The various sections of the loader are in substantial alinement and parallel with the mine track 154. The machine is illustrated as loading a mine car 157.

In Fig. 10, it will be observed, the cables 38 and 39 extend to opposite sides of the machine, being anchored to suitable anchors such as jacks 84b, 84b, positioned at substantially equal distances from the machine, thus maintaining the gathering conveyor A in alinement. Cable 123 is shown anchored to jack 84a positioned closely adjacent to the mine track 154, the cable extending forwardly of the machine and feeding the same in a forward direction upon operation of drum 123a to wind up the cable thereon. It is obvious, of course, that the cable 123 is readily removable from the various sheaves to effect the desired manipulation of the cable.

Figure 11:
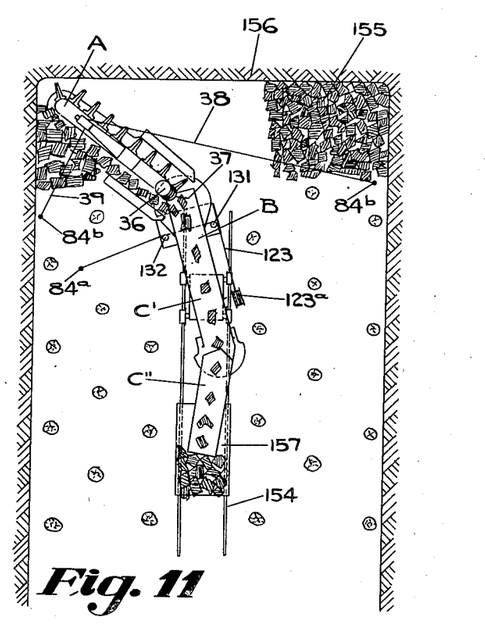
Fig. 11 is a diagrammatic view showing the position of the machine when loading a mine car from the left side of a square mine face.

Fig. 11 shows the position of the machine when loading a mine car from the left side of a square mine face. It will be observed that the gathering conveyor A has been swung to the left by paying out cable 38, drum 36 being free, while winding in cable 39 on drum 37. The pull exerted on the conveyor by winding cable 39 obviously swings conveyor A to the left. Cables 38 and 39 are shown as anchored to jacks 84b which are in substantially the same position as in Fig. 10. Cable 123 is shown as being guided on sheaves 131 and 132, adjacent the front end of the rear or discharge conveyor and anchored to jack 84a positioned at a suitable distance to the left of the machine. Tensioning cable 123 by actuating drum 123a is here employed to swing the rear or discharge conveyor having sections B and C as a unit about the upright pivot provided by the turntable on truck 143. It will be seen that in Fig. 11, portion C'' of section C is pivoted relatively to portion C' of section C, so that the machine will easily load a mine car 157 on the track 154 notwithstanding the large amount of displacement of the gathering conveyor A. In order to effect a complete gathering of the coal, conveyor A may be laterally tilted in a vertical direction by means of jacks suitably positioned under the notches 72 of the lateral projection 71. Such jacks associated with said notches may also be used to lift the gathering unit to clear obstructions.

The positioning of the jacks under the notches 72 of the lateral projection 71 effects an initial tilting of the gathering conveyor A. The sheaves 82 and 82a are positioned sufficiently high from the floor so that when the cables 38 and 39, passed around the respective sheaves, are suitably anchored to a jack, or other remote anchorage by means of anchoring eyes such as 158, and then put under tension, the gathering conveyor is maintained tilted laterally during feeding thereof. Also for the purpose of tilting the gathering section A, a bracket 159 may be secured at the end of housing 84, which bracket is provided with a projection 160 to which the end of cable 123 may be anchored, the cable 123 being first passed around a guide sheave, or the like, mounted on an anchoring jack positioned at a required distance from the conveyor. It will be seen that since the projection 160 is at a substantial distance from the floor, a pull thereon from a cable secured thereto in the manner just described will cause the conveyor A to tilt laterally as it feeds into the coal.

Tension exerted on cable 39 will pull conveyor A first to the left and then toward the mine car, and the pivotal mounting between portions C' and C'' of section C together with the pivotal mounting of conveyors A and B will enable the gathering conveyor A to accommodate itself to the square cut configuration of the mine face.

Figure 12:
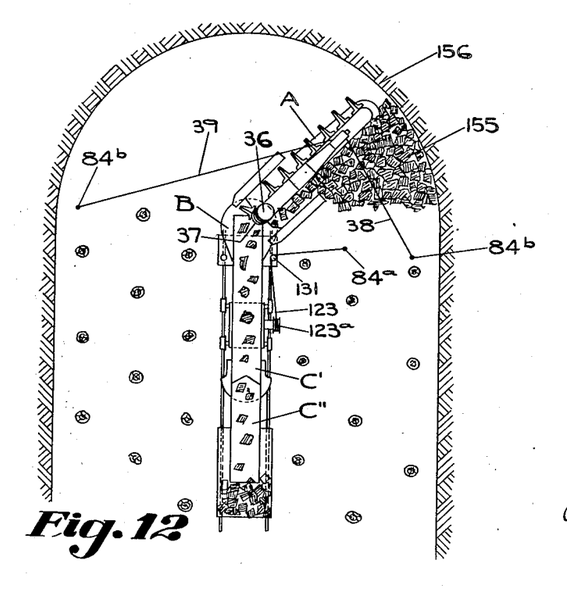
Fig. 12 is a diagrammatic view showing the position of the machine when loading from the right side of an arcuately cut mine face.

Fig. 12 shows diagrammatically the position of the machine when loading from the right side of an arcuately cut mine face, and it will be seen in this instance that cable 39 has been paid out from drum 37 while a pull is being exerted upon cable 38, which is being wound on drum 36, cables 38 and 39 being anchored to jacks 84b, 84b, cable 123 being passed around sheave 131 and anchored to jack 84a in the position indicated in Fig. 12. Cable 123 is maintained sufficiently taut, of course, to hold the machine in proper position against displacement.

Figure 13:
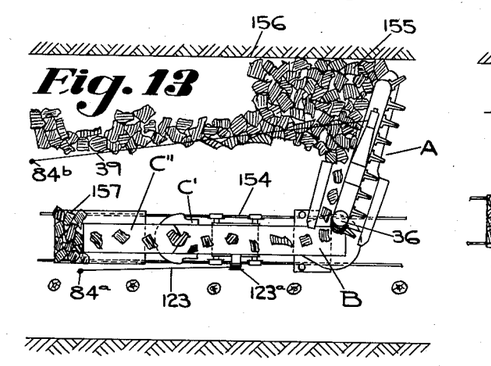
Fig. 13 is a diagrammatic view showing the machine loading from a first cut in slabbing operations.

Fig. 13 is a diagrammatic view showing a machine loading from a first cut in slabbing operations. It will be seen that cable 39 is employed in this instance, the cable being wound on its drum while its end is anchored to jack 84b as clearly shown in the drawings. As the coal is gathered the loader and mine car are suitably moved together toward the left, portions C' and C'' of the loader being maintained in alinement.

Cable 38 is not used in this instance, and cable 123 is anchored to jack 84a positioned adjacent the mine car 157, as will be clear from the drawings, and the pull exerted upon cable 123 by winding upon the drum 123a will correspondingly move the loader along the track 154 at a rate of speed commensurate with the gathering operations.

Figure 14:
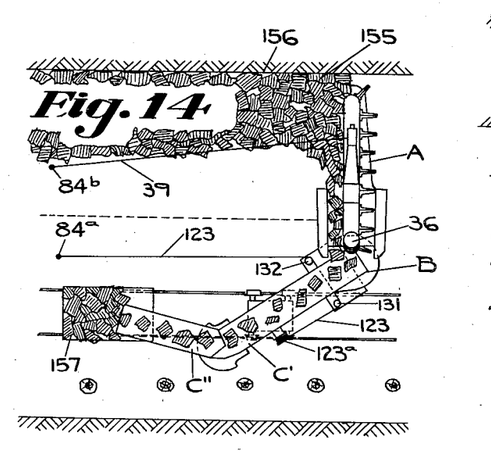
Fig. 14 is a diagrammatic view showing the position of the machine when loading from a second cut in slabbing operations.

Fig. 14 shows the position of the machine when loading from a second cut in slabbing operations. It will be observed that in this operation pivotal movement is effected between portions C' and C'', feeding of the loader being accomplished by passing cable 123 around sheaves 131 and 132 and anchoring the free end of the cable 123 to a jack 84a positioned adjacent the mine car 157 but on the opposite side of the mine car from the showing in Fig. 13.

Figure 15:
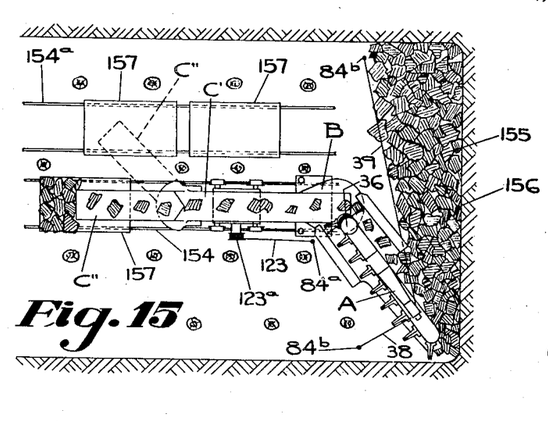
Fig. 15 is a diagrammatic view showing the position of the machine when loading in a mine room provided with a double track.

Fig. 15 shows the position of the machine when loading in a mine room provided with a double track. It will be seen that mine cars 157, 157, 157, are positioned on double tracks 154 and 154a, the cars on the track 154a being loadable from the loader on track 154 through the pivotal mounting of portion C" of section C as will be seen from the dotted line position of portion C" in Fig. 15.

In order to move the gathering section A to the left, cables 38 and 39 have been paid out and anchored to jacks 84b, 84b, as will be clear from the figure, cable 38 being slack and cable 39 being wound upon its drum 37 so as to pull gathering section A toward the left-hand wall of the mine room as viewed in Fig. 15.

Cable 123 has been brought forward and anchored to jack 84a positioned adjacent track 154 and gathering section A. This prevents displacement of the loader during operation thereof.

Figure 16:
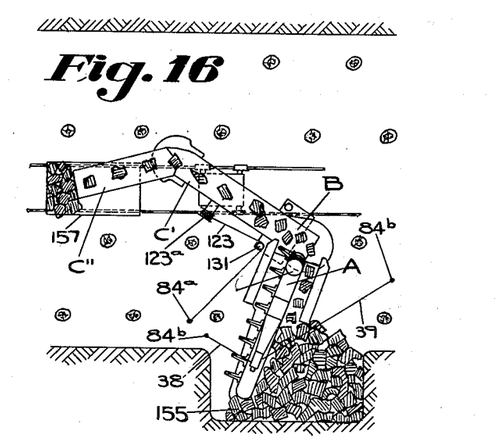
Fig. 16 is a diagrammatic view showing the position of the machine when loading from a cross-cut in a mine room when no track is employed in the cross-cut.

Fig. 16 shows the position of the machine when loading from a cross-cut in a mine room when no track is employed in the cross-cut. It will be observed that the pivotal mounting between portions C" and C' enables the loader to be swung into position so that the gathering section A will be enabled to engage the coal in the cross-cut, the entire rear conveyor B being pivotally turned relatively to the truck. Cables 38 and 39 are anchored to jacks 84b as shown, and cable 39 is wound on to drum 37 in order to move gathering conveyor A to the right as viewed in Fig. 16 so as to gather up the coal. It will be seen that notwithstanding the very substantial displacement of the sections of the loader relatively to each other, the mine car 157 is continuously loaded. Cable 123 is passed around sheave 131 and anchored to jack 84a, as will be clear from the drawings.

Figure 17:
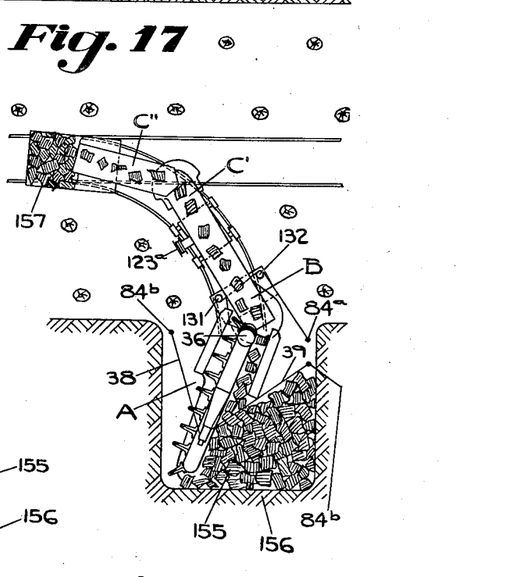
Fig. 17 is a diagrammatic view showing the position of the machine when loading from a cross-cut in a mine room when the machine is positioned on a sharp curve.

Fig. 17 shows the position of the machine when loading from a cross-cut in a mine room when the machine is positioned on a sharp curve. It will be seen that the position of the anchoring jacks 84b is such that when a pull is exerted by winding cable 39, the coal will be continuously gathered and fed to mine car 157. Cable 123 is passed around sheaves 131 and 132 as clearly shown in the drawings, and anchored to jack 84a positioned on the left-hand side of the machine and relatively forwardly thereof.

It will be observed from Figs. 10 to 17 inclusive that the loader of the present invention possesses a high degree of flexibility so that a mine car may be continuously loaded regardless of the nature or location of the working operations.

It will be observed that access to the springs 23 of flexible coupling 19 for adjustment thereof may be afforded by means of plate 161, which is hingedly mounted at 162 for enabling the plate to be vertically lifted.

In the interest of clearness and in order not to burden the disclosure of the drawings and the specification with structural details which per se form no part of the invention herein claimed the structures of a number of the parts are shown generally and not in specific detail. In my Patent No. 2,047,589, dated July 14, 1936, and entitled Material handling mechanism, I have illustrated in more detail a number of the structural elements herein shown generally. For example, in said patent the structure of the conveyor mechanism including chain 117, flights 151 and guides 118, 150 and 152 is shown in full detail. Likewise, the structure which provides for the relative swinging movement between the sections C' and C" of conveyor C while maintaining a continuous conveyor channel is illustrated in full detail in said patent. Still further, said patent illustrates in full detail the structure and mounting of the turntable which supports the rear or discharge conveyor having sections B and C for pivotal movement on the truck 143 about a vertical or upright axis. As above stated, since the structural details of these individual elements per se are not the subject matter of any of the claims of this patent they are not disclosed herein in detail.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. Material handling mechanism comprising a gathering conveyor and means having notched projections and extending laterally from the longitudinal axis of the gathering conveyor adapted to receive a lifting tool therebeneath for effecting a lateral tilting of the gathering conveyor.

2. Material handling mechanism comprising, in combination, a pair of interconnected conveyors, one of which is a gathering conveyor and one a discharge conveyor, a pivotal mounting for the gathering conveyor enabling said gathering conveyor to be fed laterally relatively to the discharge conveyor, a hinged connection between the gathering conveyor and its adjacent discharge conveyor enabling the gathering conveyor to be laterally tilted, and means having notched projections and extending laterally from the gathering conveyor adapted to receive a lifting tool therebeneath for effecting a lateral tilting of the gathering conveyor.

3. Material handling mechanism comprising the combination with a pair of interconnected conveyors, one of which is a relatively fixed discharge conveyor and the other a gathering conveyor pivotally attached to said discharge conveyor for lateral swinging movement and for tilting thereof, of means for operating the gathering mechanism of said gathering conveyor, for swinging said gathering conveyor laterally and for tilting said gathering conveyor comprising a motor carried by said gathering conveyor, a shaft driven by said motor, said shaft driving said gathering mechanism, a pair of drums mounted on said shaft, means for reversing the operation of said motor, means responsive to the reversal of operation of said motor for effecting a driving connection between a selected one of said drums and said shaft while the gathering mechanism reverses its direction of travel, cables attached at one end to each of said drums, said cables being reeved through pulleys adjacent the top of said gathering conveyor and adapted to be anchored at their other ends, whereby when the motor is operated a selected drum will be operated automatically and the gathering conveyor will swing in a predetermined direction about its pivot and assume a tilted position, and said gathering mechanism will be operated in a predetermined direction to gather material and convey it to the discharge conveyor.

4. Material handling mechanism comprising the combination with a pair of interconnected conveyors, one of which is a relatively fixed discharge conveyor and the other a gathering conveyor pivotally attached to said discharge conveyor for lateral swinging movement and for tilting thereof, of means for operating the gathering mechanism of said gathering conveyor, for swinging said gathering conveyor laterally and for tilting said gathering conveyor comprising a motor carried by said gathering conveyor, a shaft driven by said motor, said shaft driving said gathering mechanism, a pair of superposed drums mounted on said shaft, means for effecting connection of a selected one of said drums to said shaft and simultaneously effecting a disconnecting of the other drum from said shaft, cables attached at one end to each of said drums, said cables extending from said drums to anchor points and connected to said gathering conveyor adjacent the top thereof, whereby said motor may be operated to effect operation of said gathering mechanism and effect lateral swinging movement of said gathering conveyor while it is maintained in a tilted position.

5. In a material handling mechanism, the combination with a truck mounted discharge conveyor having a material receiving end in a low position and a material discharge end, of a gathering conveyor pivotally connected to said discharge conveyor at said material receiving end for lateral swinging movement and for tilting movement, said gathering conveyor being adapted to swing over a mine bottom to gather material and discharge said material on said discharge conveyor at the material receiving end thereof, gathering mechanism carried by said gathering conveyor, a motor carried by said gathering conveyor, a shaft extending substantially at right angles to the plane of movement of said gathering mechanism and interconnecting said motor and said gathering mechanism, a pair of drums on said shaft, means for selectively connecting one of said drums to said shaft, swinging means adapted to extend laterally of said gathering conveyor to either side and attached to said drums, said means being selectively operative through the selective operation of said drums to effect lateral swinging of said gathering conveyor in a desired direction and to effect simultaneous tilting thereof.

6. In a loader, the combination with a truck having track riding wheels, of a discharge conveyor pivotally mounted on said truck, a gathering conveyor mounted for swinging movement with respect to said discharge conveyor, three drums, individual cables for said drums, power means for operating said drums, one of said drums and associated cable being operable to move said truck to feed said loader and to swing the forward end of said discharge conveyor laterally, the other of said drums being operable selectively to swing said gathering conveyor in reverse directions, in cooperation with their associated cables.

7. In a loader, the combination with a main frame, of a discharge conveyor mounted thereon and extending forwardly and downwardly therefrom, a gathering conveyor pivotally mounted at the forward end of said discharge conveyor and positioned to feed material thereto, said gathering conveyor having a forward end adapted to gather material while said gathering conveyor is swung in reverse directions about its pivotal axis, means for swinging said gathering conveyor as aforesaid including two independently operable drums and associated cables adapted to be anchored in a mine room, and means for bracing the forward end of said discharge conveyor against lateral movement during swinging of said gathering conveyor including a motor driven drum carried thereby and a cable on said drum adapted to have its free end anchored laterally of said machine.

8. In a loader, the combination with a main frame, of a discharge conveyor mounted thereon and extending forwardly and downwardly therefrom, a gathering conveyor pivotally mounted at the forward end of said discharge conveyor and positioned to feed material thereto, said gathering conveyor having a forward end adapted to gather material while said gathering conveyor is swung in reverse directions about its pivotal axis, means for swinging said gathering conveyor as aforesaid, and means for bracing the forward end of said discharge conveyor against lateral movement during swinging of said gathering conveyor including a motor driven drum carried thereby and a cable on said drum adapted to have its free end anchored laterally of said machine.

9. In a loading machine, the combination with a truck adapted to travel on a mine track, of a discharge conveyor mounted thereon for adjustment relative thereto on an upright axis and extending beyond said truck with the front end in a lowered position, a gathering conveyor pivoted to the forward end of said discharge conveyor and adapted to swing relatively thereto on an upright axis while in delivering communication with said discharge conveyor, rope gearing comprising two independently operable cables for swinging said gathering conveyor laterally in reverse directions, and additional rope gearing including a drum carried by said main frame having a cable thereon and means for directing said cable for pulling said loading machine along said track and for exerting a lateral pull on the forward end of said discharge conveyor to counteract the force thereon caused by lateral swinging of said gathering conveyor.

10. In loading apparatus, the combination with a truck, of a discharge conveyor mounted thereon for adjustment relative thereto on an upright axis and extending forwardly and downwardly from said truck, additional means on the forward portion of said discharge conveyor for supporting said forward portion near the mine bottom, a gathering conveyor pivoted to the forward end of said discharge conveyor to swing relative thereto on an upright axis, rope winding mechanism, a rope extending from said winding mechanism to and from the front end portion of said discharge conveyor and to an anchorage extraneous to the machine for predetermining the direction of pull on the forward end portion of said discharge conveyor, means for guiding the rope laterally to said anchorage from said discharge conveyor at a position intermediate said truck and said additional supporting means, and additional means for swinging said gathering conveyor in reverse directions.

11. In a loading machine, the combination with a truck movable along a trackway, of a discharge conveyor pivotally mounted thereon and extending downwardly and forwardly into proximity to said trackway, a gathering conveyor connected to said discharge conveyor to swing relative thereto on an upright axis in advance of said trackway, means comprising two independently operable rope gearings connected to swing the gathering conveyor in opposite directions to gather material for delivery to said discharge conveyor, and means including a third rope gearing to prevent pivotal movement of said discharge conveyor relative to the truck as said gathering conveyor swings as aforesaid.

12. In loading apparatus, the combination with a truck adapted to travel on a mine track, of a conveyor having a receiving end adjacent to the mine track and mounted on said truck for adjustment relatively thereto on an upright axis, a gathering conveyor pivotally connected to said receiving end for swinging movement relatively thereto on an upright axis, means comprising a power operated drum and cable mechanism for pulling said apparatus along said track at a feeding speed and for bracing said receiving end against lateral movement due to swinging of the gathering conveyor, and means for swinging the gathering conveyor for a gathering operation on its upright axis relative to said receiving end.

13. In loading apparatus, the combination with a truck adapted to travel on a mine track, of a conveyor mounted on said truck for adjustment relative thereto on an upright axis, the front end of said conveyor being adapted to occupy a position adjacent to the mine track, a gathering conveyor pivotally connected to said relatively low front end of said first-named conveyor for swinging movement relative thereto on an upright axis, means for adjusting the position of said front end of said first-named conveyor by swinging it relative to said truck, and additional means for operating said gathering conveyor to gather a load by swinging the same on its upright axis relatively to said first-named conveyor while in delivery communication therewith.

14. In loading apparatus, the combination with a truck adapted to travel along a mine track, of a discharge conveyor mounted on said truck for lateral adjustment relative thereto on an upright axis, means associated with the forward portion of said discharge conveyor for moving the latter laterally relative to the mine track and for longitudinal feeding movement of the discharge conveyor along the mine track, a gathering conveyor pivotally connected to the forward end of said discharge conveyor for swinging movement relatively thereto on an upright axis, the aforesaid means comprising a rope winding mechanism mounted on said truck, a rope connected to said rope winding mechanism and having its free end adapted to be connected to an anchorage in the mine extraneous to the machine for moving the truck together with said discharge conveyor along the mine track while said gathering conveyor engages the ground surface in advance of the mine track to effect sumping of the gathering conveyor into a pile of material to be loaded, and means for guiding the rope from the rope winding mechanism to and from a pulley on the forward end of said discharge conveyor, and additional means for swinging said gathering conveyor in reverse directions.

15. In a loading machine, the combination with a truck adapted to travel on a mine track, of a discharge conveyor mounted on said truck for adjustment relative thereto on an upright axis, means for supporting the front end of said discharge conveyor on the mine track, means preventing lateral movement of said discharge conveyor relatively to the mine track, a gathering conveyor pivotally connected to the forward end of said discharge conveyor for swinging movement relative thereto on an upright axis while remaining in delivery communication with said discharge conveyor, said second-named means comprising a rope extending from rope winding mechanism along guiding means transversely of the discharge conveyor in advance of the truck to an anchorage in the mine extraneous to the machine, and a pair of additional rope winding mechanisms operable to swing said gathering conveyor independently of said first-named rope winding mechanism.

16. In a loading machine, the combination with a truck, of a discharge conveyor mounted on said truck for pivotal movement as a unit with respect thereto about a vertical axis, said conveyor comprising an endless material moving means which travels in a continuous trough, said trough comprising two sections one of which is a discharge section which are mounted for pivotal movement about a vertical axis whereby material may be discharged to either side of said truck either by pivoting said discharge conveyor as a unit about a vertical axis with respect to said truck or by pivoting said discharge section about a vertical axis, a gathering conveyor pivotally mounted and positioned to feed said discharge conveyor, means for swinging said gathering conveyor to gather material, and independently operable means for swinging said discharge conveyor relative to said truck.

17. In a loading machine, the combination with a truck, of a discharge conveyor including a continuous trough mounted on said truck for pivotal movement as a unit with respect thereto about a vertical axis, said conveyor including an endless conveyor chain which travels in said continuous trough, said trough comprising two sections, one of which comprises a loading unit, the other of which is a discharge unit which is mounted for pivotal movement about a vertical axis with respect to both said loading unit and said truck, whereby material may be discharged to either side of said truck either by pivoting said conveyor as a unit about a vertical axis with respect to said truck or by pivoting said discharge unit about a vertical axis relative to said truck, a swingable gathering conveyor for feeding said loading unit, and two independently operable means for adjusting said gathering conveyor and said discharge conveyor as a unit, respectively.

18. In a loading machine, the combination with a truck, of a receiving and discharging conveyor mounted on said truck for pivotal movement as a unit with respect thereto about a vertical axis, said conveyor comprising an endless material moving means which travels in a continuous trough, said trough comprising three sections, two of which are relatively pivotal about a horizontal axis and form a loading unit, the third section comprising a discharge unit which is mounted for pivotal movement about a vertical axis with respect to both said loading unit and said truck, whereby material may be discharged to either side of said truck either by pivoting said conveyor as a unit about a vertical axis with respect to said truck or by pivoting said discharge unit about a vertical axis relative to said truck, a gathering conveyor pivoted for swinging movement, and two independently operable power operated means for independently adjusting said conveyors.

19. In a loading machine, the combination with a truck adapted to travel in a mine, of a discharge conveyor on said truck for pivotal movement as a unit with respect thereto about a vertical axis passing intermediate the ends thereof whereby both the material receiving end and the discharge end of said conveyor may be positioned laterally of said truck, said conveyor comprising two sections which are connected for relatively pivotal movement about a vertical axis and a continuous material moving means for said sections, a gathering conveyor pivoted for swinging movement about a vertical axis, and positioned to feed said discharge conveyor, means for swinging said gathering conveyor to gather material, and independently operable means for swinging said discharge conveyor as a unit relative to said truck.

20. In a loading machine, the combination with a truck, of a material receiving and discharging conveyor mounted on said truck for pivotal movement as a unit with respect thereto about a vertical axis passing intermediate its ends whereby both ends of said conveyor may project laterally of said truck, said conveyor comprising a material receiving section and a discharge section and a continuous material moving means, said sections being connected for relative pivotal movement about a vertical axis, a gathering conveyor pivoted about a vertical axis with respect to the material receiving section and adapted to gather material and feed it to said material receiving section, and independently operable rope and drum mechanisms for swinging each of said conveyors about their pivotal axes.

NILS D. LEVIN.